Patented Dec. 9, 1941

2,265,157

UNITED STATES PATENT OFFICE 2,265,157

LEUCO-ESTERS OF N-DIHYDRO-1:2-2':1'-ANTHRAQUINONE AZINES

Karl Glenz, Basel, Switzerland, assignor to the firm Durand & Huguenin A. G., Basel, Switzerland No Drawing. Application April 27, 1940, Serial No. 332,102. In Germany May 15, 1939

9 Claims. (Cl. 260—264)

In British specification No. 330,579 is described a manufacture of leuco esters soluble in water by the action of a meta-benzoic acid sulphohalide on a leuco derivative of a vat-dyestuff. From these products the corresponding vat-dyestuff can be regenerated by the action of alkalies.

If for instance the vat-dyestuff N-dihydro-1:2-2':1'-anthraquinone azine in the form of its leuco compound is converted into its derivative soluble in water by the process of said British specification (Example 2) there is obtained a product which is only sparingly soluble in water to a red-violet solution.

The present invention is based on the surprising observation that by causing a benzoic acid disulphohalide, for example benzoic acid-3:5-disulphochloride, to act on the leuco compound of N-dihydro-1:2:2':1:-anthraquinone azine there is obtained as the main product a compound which is soluble in water to a red-brown solution having an intense green fluorescence. The product is very much more easily soluble than that obtained according to Example 2 of said British specification.

It might have been expected that benzoic acid disulphochloride would yield an esterification product more readily soluble in water than the product of Example 2 of said specification. If, however, the new product corresponds in its reduction stage with dihydroindanthrene it should likewise have a violet color.

The following is known of the series of the acid sulphuric esters of leucoindanthrene:

There exist two types of enol-esters which differ considerably from one another.

I. Disulphuric acid esters of leuco-N-dihydro-1:2-2':1'-dianthraquinone azine sodium salt

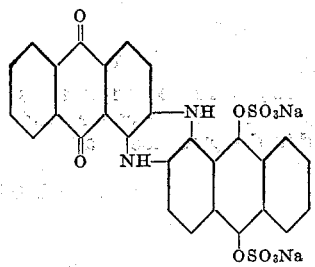

The disulphuric acid ester of leuco-N-dihydro-1:2-2':1'-anthraquinone azine in the form of its alkali salts is sparingly soluble in water to a violet solution. The violet products referred to in the aforesaid specification correspond with the disulphuric acid esters. The ratio of dyestuff to sulphur was determined by saponification analysis and it was established that the products are derivatives of dihydroindanthrene.

II. Tetrasulphuric acid esters of tetrahydrodianthraquinone azine sodium salt

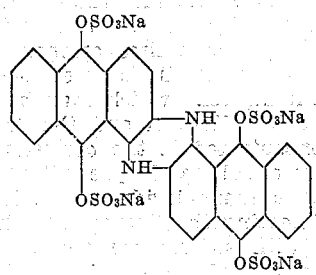

or

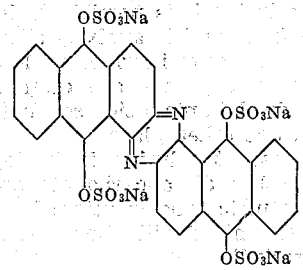

In contrast to the aforesaid disulphuric acid esters the alkali salts of the tetrasulphuric acid ester of tetrahydroindanthrene are remarkably easily soluble in water to yellow-brown solutions which are distinguished by an intense green fluorescence.

The fluorescent ester made in accordance with the invention from leucoindanthrene and benzoic acid disulphochloride corresponds with the tetrasulphuric acid ester. It is likewise extremely readily soluble in water and its solutions show the typical green fluorescence. It was ascertained by spectroscopic comparison that the new ester has the same spectrum as the tetrasulphuric acid ester of tetrahydroindanthrene; in each case the absorption was found to be at 478μμ. It has also been established by determination of the ratio of dyestuff to sulphur that this easily soluble compound is in fact derived from tetrahydroindanthrene, that is to say it contains four esterified enol groups. Consequently in the process of the present invention the acylation must be accompanied by a reduction. Such a course of reaction, proceeding by way of several intermediate stages, could not be foreseen.

The new compound can be split by the action of alkalies with the formation of a vat and is a valuable product in dyeing and printing.

The reaction in accordance with the invention proceeds fairly smoothly in the presence of pyridine. If instead of pyridine a homologue thereof, such as picoline, or another tertiary base is used, there are obtained in larger quantities products yielding violet solutions in addition to the product yielding a fluorescent solution.

The following example illustrates the invention, the parts being by weight:

40 parts of benzoic-acid-3:5-disulphochloride are introduced into 240 parts of dry pyridine. To the addition compound of pyridine with the acid chloride thus obtained are added 20 parts of the dry leuco compound of N-dihydro-1:2-2':1'-anthraquinone azine (prepared by reducing with caustic soda solution and hydrosulphite, acidifying the blue vat and drying the product under reduced pressure in an atmosphere of carbondioxide without use of a solvent). The mixture is heated for 1 hour at 70° C. in a current of dry nitrogen. The reaction mixture is then poured into water, and the whole is distilled under reduced pressure until free from pyridine and at the same time strongly concentrated. Any sparingly soluble violet di-ester and unchanged indanthrene which may be present are separated by filtration and the red-brown filtrate is concentrated to the consistency of a paste. The ester salt can be precipitated by the addition of potassium chloride and much alcohol.

By gently heating the fluorescent solution of the product with sodium carbonate the fluorescence is destroyed and a violet solution is obtained.

From this solution it is possible to isolate by salting out a body which analysis shows to be a leucoindanthrene ester in which no longer four but only two enol groups are esterified with benzoic acid disulphonic acid, so that partial saponification has taken place.

If the fluorescent solution is heated for a longer time with sodium carbonate or if it is treated with caustic soda solution, the product is completely saponified with the regeneration of the parent dyestuff.

The leuco compounds of 3:3'-dichloro-N-dihydro-1:2-2':1'-anthraquinone azine, of 3:3'-dibromo-N-dihydro-1:2-2':1'-anthraquinone azine or of N-dihydro-1:2-2':1'-anthraquinone azine -3:3'-dicarboxylic acid yield under the conditions above described products which are likewise easily soluble in water to brown to reddish-brown solutions having a green fluorescence.

What I claim is:

1. A process for the manufacture of easily water soluble leuco-esters of N-dihydro-1:2-2':1'-anthraquinone azine dyestuffs, comprising causing the leuco compound of a N-dihydro-1:2-2':1'-anthraquinone azine to react with a benzoic acid disulphohalide in the presence of a pyridine base.

2. A process for the manufacture of easily water soluble leuco-esters of N-dihydro-1:2-2':1'-anthraquinone azine dyestuffs, comprising causing the leuco compound of N-dihydro-1:2-2':1'-anthraquinone azine to react with a benzoic acid disulphohalide in the presence of a pyridine base.

3. A process for the manufacture of easily water soluble leuco-esters of N-dihydro-1:2-2':1'-anthraquinone azine dyestuffs, comprising causing the leuco compound of 3:3'-dichloro-N-dihydro-1:2-2':1'-anthraquinone azine to react with a benzoic disulphohalide in the presence of a pyridine base.

4. A process for the manufacture of easily water soluble leuco-esters of N-dihydro-1:2-2':1'-anthraquinone azine dyestuffs, comprising causing the leuco compound of a N-dihydro-1:2-2':1'-anthraquinone azine to react with a benzoic acid disulphochloride in the presence of a pyridine base.

5. A process for the manufacture of easily water soluble leuco-esters of N-dihydro-1:2-2':1'-anthraquinone azine dyestuffs, comprising causing the leuco compound of a N-dihydro-1:2-2':1'-anthraquinone azine to react with a benzoic acid disulphohalide in the presence of pyridine.

6. A process for the manufacture of an easily water soluble leuco-ester of N-dihydro-1:2-2':1'-anthraquinone azine, comprising causing the leuco compound of N-dihydro-1:2-2':1'-anthraquinone azine to react with a benzoic acid disulphochloride in the presence of pyridine.

7. A process for the manufacture of an easily water soluble leuco-ester of 3:3'-dichloro-N-dihydro-1:2-2':1'-anthraquinone azine, comprising causing the leuco compound of 3:3'-dichloro-N-dihydro-1:2-2':1'-anthraquinone azine to react with a benzoic acid disulphochloride in the presence of pyridine.

8. As new articles of manufacture easily water soluble leuco-esters of N-dihydro-1:2-2':1'-anthraquinone azines, wherein the hydrogen atoms of the four enolic hydroxy groups are substituted by the radical

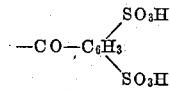

said esters giving brown to red-brown watery solutions with intense green fluorescence and yielding when warmed in the presence of alkali the parent dyestuff.

9. As new article of manufacture the easily water soluble leuco-ester of 3:3'-dichloro-N-dihydro-1:2-2':1'-anthraquinone azine, wherein the hydrogen atoms of the four enolic hydroxy groups are substituted by the radical

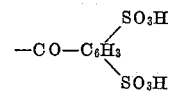

said ester giving a red-brown watery solution with intense green fluorescence and yielding when warmed in the presence of alkali the parent dyestuff.

KARL GLENZ.